United States Patent [19]

Schreiber

[11] Patent Number: 4,500,919

[45] Date of Patent: Feb. 19, 1985

[54] COLOR REPRODUCTION SYSTEM

[75] Inventor: William F. Schreiber, Cambridge, Mass.

[73] Assignee: Massachusetts Institute of Technology, Cambridge, Mass.

[21] Appl. No.: 374,804

[22] Filed: May 4, 1982

[51] Int. Cl.³ ............................................. H04N 1/46
[52] U.S. Cl. ......................................... 358/78; 358/80
[58] Field of Search .................................... 358/75–80

[56] References Cited

U.S. PATENT DOCUMENTS

| 3,612,753 | 10/1972 | Korman | 355/38 |
|---|---|---|---|
| 3,647,295 | 3/1972 | Dobouney | 355/38 |
| 3,674,364 | 3/1970 | Korman | 358/75 |
| 3,879,750 | 4/1975 | Seckel | 358/76 |
| 3,893,166 | 7/1975 | Pugsley | 358/80 |
| 3,972,066 | 7/1976 | Seki et al. | 358/76 |
| 4,037,249 | 7/1977 | Pugsley | 358/76 |
| 4,058,828 | 11/1977 | Ladd | 358/80 |
| 4,060,829 | 11/1977 | Sakamoto | 358/80 |
| 4,080,634 | 3/1978 | Schreiber | 358/298 |
| 4,096,523 | 6/1978 | Belmares-Sarabia et al. | 358/80 |
| 4,127,871 | 11/1978 | Sakamoto | 358/80 |
| 4,204,223 | 5/1980 | Gast et al. | 358/80 |
| 4,328,515 | 5/1982 | Wellendorf | 358/80 |
| 4,335,398 | 6/1982 | Yamada | 358/80 |
| 4,349,279 | 9/1982 | Jung | 358/80 |
| 4,393,398 | 7/1983 | Horiguchi | 358/80 |
| 4,393,399 | 7/1983 | Gast | 358/78 |
| 4,402,007 | 8/1983 | Yamada | 358/78 |

FOREIGN PATENT DOCUMENTS

| 070680 | 1/1983 | European Pat. Off. . |
| 080350 | 6/1983 | European Pat. Off. . |
| 090596 | 10/1983 | European Pat. Off. . |
| 2607623 | 9/1977 | Fed. Rep. of Germany . |
| 1565694 | 4/1980 | United Kingdom . |
| 2050751A | 1/1981 | United Kingdom . |
| 2053619B | 2/1981 | United Kingdom . |
| 1594569 | 7/1981 | United Kingdom . |
| 2117902A | 10/1983 | United Kingdom . |

OTHER PUBLICATIONS

Pugsley, Peter C., Pre-Press Picture Processing in the Graphic Arts Industry, IEEE Transactions on Communications, vol. COM-29, No. 12, Dec. 1981, pp. 1891–1897.

M.S. Thesis, Sudhindra Nath Mishra, A Real-Time Ink Correction Module for Helio-Engraving Process, May, 1981, Massachusetts Institute of Technology.

M.S. Thesis, Edward Ashford Lee, A Digital Color Translation System, May, 1981, Massachusetts Institute of Technology.

Rhodes, Warren L., Proposal for an Empirical Approach to Color Reproduction, Color Research and Application, vol. 3, No. 4, Winter 1978, pp. 197–201.

Troxel, Donald E., Automated Engraving of Gravure Cylinders, IEEE Transactions on Systems, Man, and Cybernetics, vol. SMC-11, No. 9, Sep., 1981, pp. 585–596.

Primary Examiner—Michael A. Masinick
Attorney, Agent, or Firm—Arthur A. Smith, Jr.; Thomas J. Engellenner

[57] ABSTRACT

A system for reproducing a color original in a medium using a selected multiplicity of reproduction colorants, comprising: a scanner for producing from said color original a train of appearance signals dependent on at least three color values of said original; aesthetic correction circuitry for introducing aesthetically desired alteration into said appearance signals to produce modified appearance signals; and colorant selection mechanism for receiving said modified appearance signals and for selecting corresponding reproduction signals representing values of said reproduction colorants to produce in said medium a color match of said modified appearance signals.

21 Claims, 9 Drawing Figures

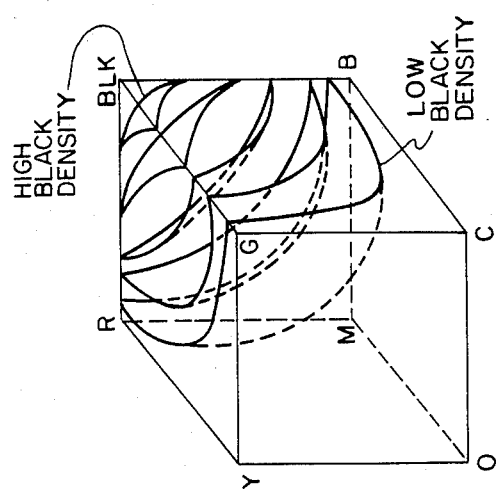
FIG. 6
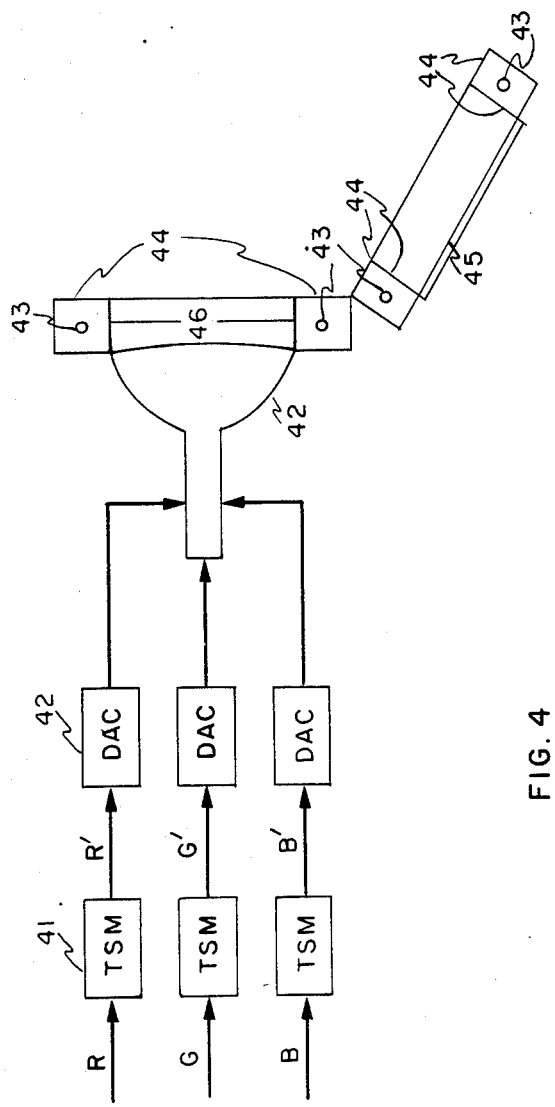
FIG. 4
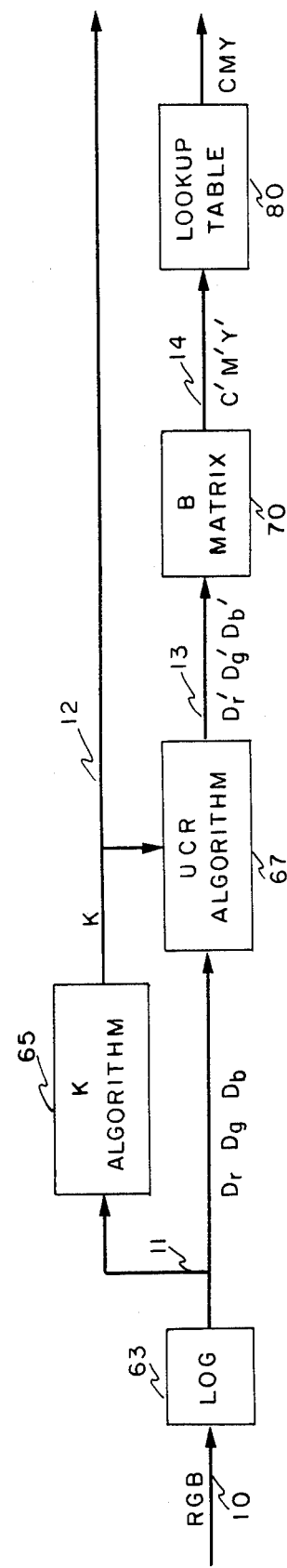
FIG. 5 INK CORRECTION MODULE

COLOR REPRODUCTION SYSTEM

BACKGROUND OF THE INVENTION

Attention is directed to a masters thesis by S. N. Mishra entitled "Real Time Ink Correction Module" (MIT, May, 1981) and a masters thesis by E. A. Lee entitled "Digital Color Translation" (MIT, May, 1981) both prepared under my supervision and hereby incorporated by reference. Attention is also directed to article written by myself and others, D. E. Troxel et al. entitled "Automated Engraving of Gravure Cylinders" *IEEE Transactions on Systems, Man and Cybernetics*, Vol. SMC-11, No. 9, pp 585-596 (September 1981) also incorporated herein by reference.

This invention relates to color processing and, in particular, to computer-assisted color editing systems. Its primary use is in color printing by the three most common processes—offset lithography, letterpress, and gravure. It is also applicable to plateless printing such as Xerography, to photography, and to any other color reproduction process which uses a small number of colorants, usually three or four, in various mixtures, more or less to match the colors of the original. In all these processes, it is usual to form three separate images by photographing or scanning the original through three different color filters, normally red, green, and blue. These three color separations are combined in various ways to produce printing plates or the equivalent thereof, which in turn control the amount of each colorant deposited at each point of the reproduction. A problem common to these processes is that the exact combination of colorants required for the match is not related, in any simple way, to measurements which can be made on the original. Achieving high quality reproduction is therefore difficult, costly, time-consuming, and requires great skill and experience on the part of the operator.

Another problem in these systems is that in almost all cases, exact matching of the original is neither possible nor desirable. Originals may not be perfect and, of at least equal importance, the gamut achievable with a particular set of inks and paper is often less than that of the original. Therefore deliberate distortion must be introduced. While this is possible, it is quite difficult to predict the precise effect of such distortion, so that in many cases trial plates must be made and proofs printed, thus adding to the cost.

In order better to describe my invention and its relation to the prior art, the following terms are defined at the outset:

Tristimulus Values—The amounts of three primary colored lights, which, when added, produce a visual, or "colorimetric" match with an original color. Such a set of primaries consists of the red, green, and blue phosphor colors of a TV tube, in which case the tristimulus values are called R, G, and B.

Appearance Signals—Values produced by any reversible transformation of RGB. Luminance/chrominance (LC1C2) and luminance, hue, and saturation (LHS) are two common sets.

Color—The specification of a colored stimulus requiring at least three component values.

Luminance—That aspect of a colored stimulus relating to its intensity.

Hue—That aspect of a colored stimulus relating to its color name.

Saturation—That aspect of a colored stimulus relating to its purity, or absence of contamination with white.

Chrominance—That aspect of a colored stimulus relating to its hue and saturation. The saturation is aproximately the ratio of chrominance amplitude to luminance.

Color Space—A three-dimensional space in which each point corresponds to a color, including both luminance and chrominance aspects. RGB form such a space. LHS form a set of cylindrical coordinates in color space. The L-axis is the diagonal of RGB space, so that $L=0$ where $R=G=B=0$, and $L=\max$ where R,G, and B are max. The C1C2 plane is perpendicular to the L-axis in LC1C2 space. The hue (angle) and chrominance (amplitude) are polar coordinates in the C1-C2 plane.

Lightness—A non-linear transformation of luminance in which equal increments are equally perceptible.

Density—The negative logarithm, to the base ten, of the reflectance or transmittance of a point in an image. In the case of colored inks or dyes, the density is measured through an appropriate color filter. The density is approximately proportional to the quantity of ink laid down. CMYK refer to the densities of cyan, magenta, yellow, and black ink normally used in printing.

Gamut—The range of colors producible with a set of inks, lights, or other colorants. The gamut can conveniently be described in terms of a particular region of a color space.

Transparent—That property of an optical medium such as a dye or an ink in which each ray of incident light is transmitted without change of direction, but attenuated (multiplied) by a factor which is always unity or less.

Standard Translation—When the reproduction gamut is smaller than the gamut of the original, the usual case, the dynamic range (contrast range) of the original must be compressed and in most cases, some highly saturated colors must be desaturated. Some special colors, such as skin tones, if they cannot be accurately reproduced, are preferably distorted in certain ways. All these changes, taken together, constitute the standard translation.

Color Mixture Curves (CMC's)—The spectral transmission curves for a set of color separation filters which produce signals which are tristimulus values with respect to a certain set of primaries.

Additive Mixture—The type of color mixture in which the light of each component is summed. A color TV tube has this type of mixture, which obeys particularly simple mixture rules.

Subtractive Mixture—The type of color mixture in which the spectral transmittance curves of the components multiply. Color films behave this way, approximately. The mixture rules are more complicated, but the resultant color can be accurately predicted. Ink mixtures as encountered in typical printing processes are more nearly subtractive than additive, but are extremely difficult to predict accurately because of non-ideal behavior of the inks.

Tone Scale Memory—A table implemented in digital hardware or in software which serves the purpose of a non-linear transformation. The addresses, typically 256, are the various levels of the input signal, while the contents, typically 8 bits at each location, are the corresponding levels of the output signal.

Colorimeter—An instrument or method for measuring the tristimulus values of arbitrary color samples.

Various patents and publications have disclosed computer-assisted color processing systems. An article by W. L. Rhodes entitled "Proposal for an Empirical Approach to Color Reproduction" in *Color Research and Application* Vol. 3, No. 4, pp 197–201 (winter 1978) summaries the history of color correction systems. An article by P. Pugsley entitled "Pre-Press Picture Processing in the Graphic Arts Industry" in *IEEE Transactions on Communications*, Vol. COM-29, No. 12, pp 1891–1897 (December 1981) described the equipment and techniques used in preparing pages containing color images for printing including the use of a look-up table technique for determining required ink densities. This look-up table system is also described in U.S. Pat. No. 3,893,166 issued to Pugsley on July 1, 1975.

A number of other patents also describe look-up table systems including U.S. Pat. No. 3,612,753 issued to Korman on Oct. 12, 1971; U.S. Pat. No. 4,058,828 issued to Ladd on Nov. 15, 1977; U.S. Pat. No. 4,060,829 issued to Sakamoto on Nov. 29, 1977; and U.S. Pat. No. 4,127,871 issued to Sakamoto on Nov. 28, 1978.

Color editing systems for printing are suggested but not fully described in U.S. Pat. No. 4,037,249 issued to Pugsley on July 19, 1977 and in Japanese Specification No. 55-115043 by Ahei and Tamada published Sept. 4, 1980. There exists a need for a generally all-encompassing, color reproduction system, particularly for rotogravure processes and the like. The system should be capable of producing color images employing the entire gamut of colors physically achievable with all possible combinations of the colorants. Moreover, the system should provide precise compensation for the effects of ink and paper which are made automatically without depending on operator skill while maintaining the capability for operator-initiated aesthetic alterations.

BRIEF SUMMARY OF THE INVENTION

I have developed a new system for making color reproductions of images. In one aspect of my invention the image is scanned in, preferably using CMC separation filters, or approximations thereto, and stored in terms of appearance values, for example RGB. The image is displayed on a TV employing three tone scale memories (TSM's), by means of which the red, green, and blue phosphor intensities are made directly proportional to the RGB signals. Thus RGB are tristimulus values with respect to the TV phosphor primary colors. Since further processing will cause the ink image, corresponding to the RGB signals, to have the same tristimulus values as the TV, the TV is a colorimetric match for the final reproduction, and can be used to judge its appearance. If the original image has a greater resolution than the TV can accomodate, an image of TV resolution, typically 512 lines with 512 samples per line, is derived from the higher resolution original by means well known in the art.

In another aspect of my invention the operator manipulates the TV image interactively in terms of appearance values, introducing aesthetic corrections and such other changes as desired. He need have no knowledge of the ink and paper characteristics in this operation. If he inadvertently calls for a color which is non-reproducible, the display will inform him so that he can make a suitable readjustment. In the case of good quality originals having no special characteristics which would call for unusual reproduction, the standard translation can be applied atutomatically, and the operator can then make any additional changes, if deemed necessary.

The original high resolution image may be processed using the same settings chosen by the operator interactively. The corrected image is returned to storage, still in terms of appearance values. [The various corrected images plus other material to be printed would normally be combined, at this stage, by some page composition process, to produce full pages in memory, but such a process is not part of the present invention.] The corrected image of stage 3 may be retrieved from storage. Ink density images, as required for a colorimetric match with the corrected images, are calculated by means including a lookup table (LUT).

In a further aspect of my invention the computed ink density images are used to produce printing plates or surfaces directly, to make intermediate images from which plates may then be made, to control a plateless printing process such as Xerography, or used in any other way to control the amount of colorant delivered to the final page at each point. Steps 4 and 5 may be combined and, if sufficient computation power is provided, page composition may also be carried out at the same time. It is obviously advantageous, once the operator has finished with all the images to be printed, to combine as many operations as possible so as to reduce the throughput time.

BRIEF DESCRIPTION OF THE DRAWINGS

FIG. 4 shows details of a comparison display which can be used by the operator to judge the prospective appearance of the final ink image.

FIG. 5 shows the operation of an Ink Correction Module (ICM).

FIG. 6 shows contours of constant black in ink density space.

DETAILED DESCRIPTION OF A PREFERRED EMBODIMENT

The invention will be described in connection with gravure printing using cylinders engraved by the Helio-Klischograph, manufactured by Rudolph Hell Gmbh. of Keil, Germany.

Gravure printing typically is carried out on web-fed rotary presses. The printing surface is in the form of a cylinder, having an array of small etched or engraved cells, typically 150 to 200 per inch. The cylinder is rotated in a bath of ink and the surface wiped clean by a "doctor blade" as the surface emerges. Paper is then fed against the cylindrical surface, picking up the ink from the cells. The ink density of every cell on paper depends upon the quantity of ink transferred from the corresponding cell on the gravure cylinder and thus depends upon the cell geometry. By modulating the cell size on the cylinder surface, it is possible to modulate the ink density of the corresponding dot on paper, thus forming a variable tone image. Ink transfer is virtually independent of speed, making this process very suitable for color printing.

The color pages are printed by overlaying multiple images, one in each primary color ink, so that the combination achieves the desired result. The primary color inks used in the printing industry are yellow, cyan (also called process blue) and magenta (also called process red). Although, in principle, it should be possible to generate any arbitrary color within the limitations of the gamut of the inks, by combining only these three primary colors, in practice, a black printer (also called the "key") is often included.

The Helio Klischograph engraves the cells in gravure cylinders by means of a battery of diamond styli which operate at 3600 to 4000 cells per second. For a typical cylinder eight feet long and forty-three inches in circumference and capable of printing thirty two magazine pages, eight styli are spaced along the cylinder. Each moves in and out, cutting four pages as the cylinder rotates, engraving the entire cylinder in about an hour. Specially prepared images called "Cronapaques" are mounted on a scanning drum which rotates in synchronism with the cylinder to be engraved. Optical sensors mounted on the scanning drum provided the video information to the diamond stylus engraving heads. Like many facsimile systems, the Helio, once started, must be supplied with a real-time data stream. The engraving takes approximately one hour with a data rate of 86.4 kilobytes/second. This imposes an upper bound of 11.5 microseconds on the processing time for the computation of ink densities from every RGB sample corresponding to a "pel" (picture element).

It will be evident to those skilled in the art what modifications would be required to operate the invention in connection with other forms of printing.

1. Scanning and Aesthetic Correction

Figure 1:
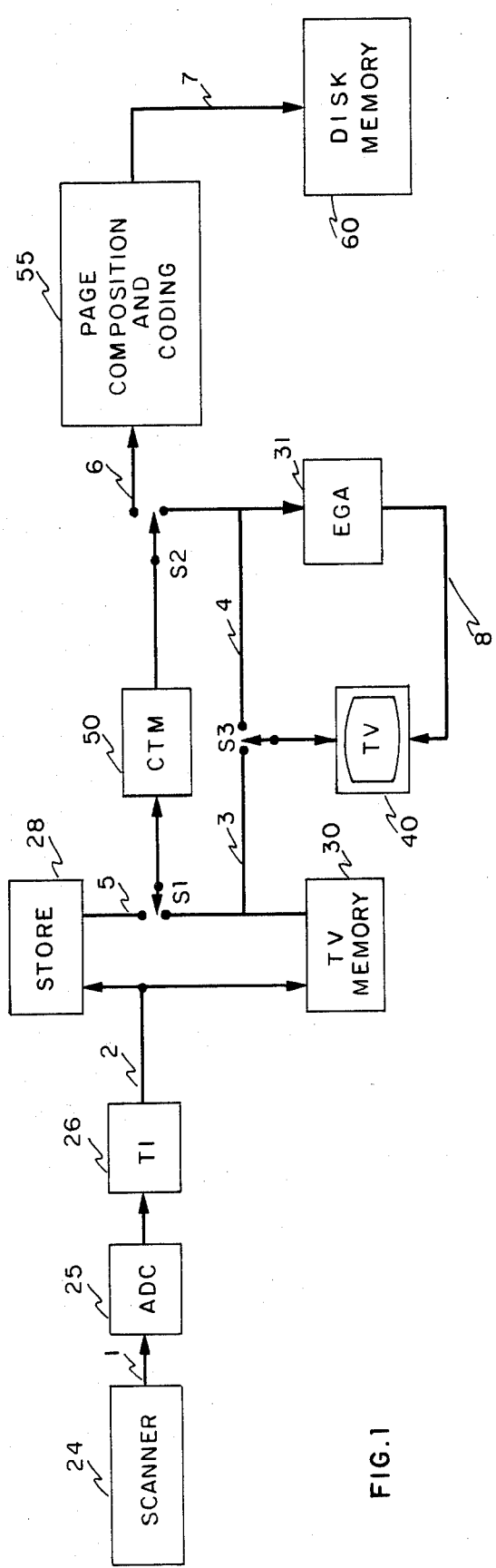
FIG. 1 shows the operation of the system from the input scanner to the point when the aesthetically corrected images are stored on disk, as appearance values, in coded form.

As shown in FIG. 1, original copy, either transparencies or prints, are scanned on a three-color scanner, 24, such as a Hell Model 299, producing three analog color head signals, 1. Note that the color computer of said scanner is not utilized. If the scanner is equipped with an unsharp masking (USM) feature, such auxiliary USM signal may be combined with the RGB signals in the usual way. The signals taken into the system are preferably proportional to lightness values rather than intensity values, so that a larger dynamic range can more readily be handled after digitization. In the afore-mentioned Hell 299 scanner, the "quasi-log" signals are suitable for this purpose. The signals are digitized by analog-to-digital converter, 25, and converted to tristimulus values, 2, by converter, 26. If the scanner is equipped with true CMC separation filters, this operation is not needed. If the deviation from the correct filter shapes is small, then the conversion can be done adequately by means of a 3×3 linear matrix. If the deviation is very large, it may be necessary to use a lookup table for accurate conversion. [However, in all cases, even if the conversion is not made, the pictures which will be viewed on the TV display (see below) will still accurately represent the final image. The CTM can then be used to correct the input errors.] The converted signals, 2, are temporarily stored in memory 28. A lower resolution version, suitable for TV display, is stored in TV memory 30. The TV memory has the property that it can be read fast enough to generate digital video of high enough data rate to give a standard thirty frame/sec display.

Switches S1 and S2 are both put in the down position so that the TV RGB signal, 3, passes through the CTM, 50. The TV display, 40, can be connected either to the input or output of the CTM by means of switch S3, although normally it is connected to the output. The operator now makes adjustments, interactively, while observing the TV display, until he is satisfied with the image. The Excess Gamut Alarm (EGA), 31, which is a lookup table, causes a tell-tale flicker of the viewed image at any point where non-reproducible colors are called for. To do this, it must make a real-time computation of the ink densities to see whether they are larger or smaller than physically realizable. It is an abbreviated version of the ICM, to be described below.

When the operator is satisfied with the image quality, he throws S1 and S2 up, passing the high resolution RGB data, 5, from the store, 28, through the CTM, generating corrected high resolution signals 6. These data are now finally stored on disk, 60, ready to be retrieved for engraving. We have found that these data can be compressed substantially if they are converted from RGB to LC1C2 form using the following relations, and the two chrominance components are then reduced in spatial resolution by a factor of two in both horizontal and vertical directions.

L=0.299 R+0.621 G+0.080 B
C1=0.498 R−0.442 G−0.056 B
C2=−0.162 R−0.336 G+0.498 B

These relationships are scaled for 0=<RGB−<255 and −128=<C1,C2=<127. The resolution reduction of C1 and C2, which does not materially affect the image quality, results in an overall 2:1 compression for the three signal components. The compression is carried out in coder, 55, which also has the page composition function, which, as mentioned above, is not a part of this invention.

In this embodiment of the invention, cylinders are engraved simultaneously with retrieving the corrected coded images from the disk. This requires that the conversion from appearance signals to signals representative of ink density must be carried out in "real" time during the engraving process. This high speed operation is required in order to take advantage of the possibility of reducing the storage requirement by storing the data in compressed appearance form.

2. Conversion to Ink Density Values and Engraving the Cylinders

Figure 2:
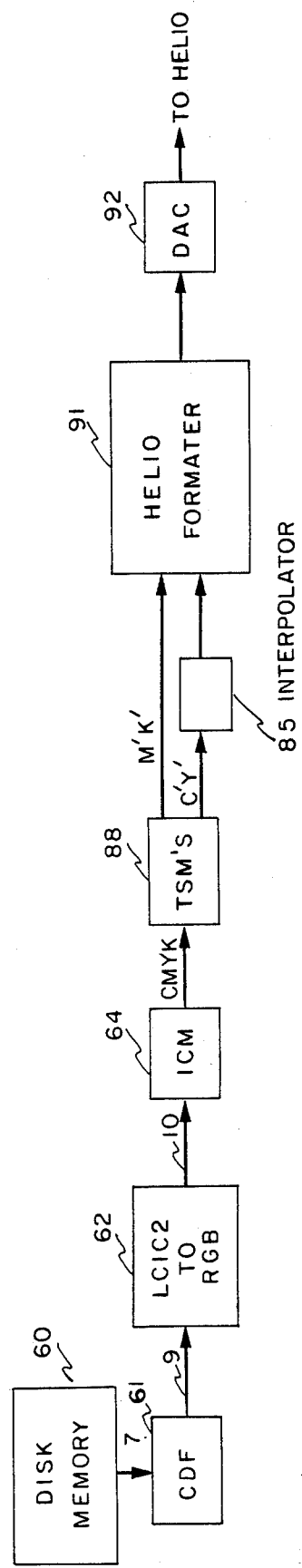
FIG. 2 shows the processes whereby the corrected appearance value images are retrieved from disk, decoded, changed into ink density images and further processed as required by the output device.

As shown in FIG. 2, the compressed images, 7, are retrieved from the disk and interpolated out to full resolution by the Color Data Formatter (CDF), 61, producing signals, 9, which are much like the signals, 6, of FIG. 1. These are now reconverted to RGB form by a transformation inverse to that shown above:

R=L+1.407 C1
G=L−0.677 C1−0.236 C2
B=L+1.848 C2

Conversion from RGB to ink density form is the function of the Ink Correction Module (ICM), 64. This can be implemented in many different ways, all of which require a lookup table. For example, since R, G, and B are 8-bit numbers, there are about 16.8 million input combinations, each of which is a numerically but not necessarily perceptibly distinct color. For each of the combinations within the gamut of printing inks, there is at least one set of CMYK values which produce a visual match. C, M, Y, and K are also 8-bit numbers. Hence a memory of 16.8 million, 32-bit words would suffice. At the present cost of memory, this might not be economic. Smaller tables plus interpolation can be used instead. Hereinafter wherever the expression "lookup table" is used, it is understood to comprise both the memory which holds a certain number of output values (the "contents" or "entries") corresponding to a certain number of input values (the "addresses"), together with interpolation means to calculate output values when input values are intermediate between those for which output values are stored in the memory. What will be described below is a scheme using a rather small amount of memory and which clearly shows the physical relationships among the variables.

The Helio Klischograph engraves cells in the cylinder producing densities on the output copy which are not exactly in proportion to the analog input signal. In order to achieve ink densities in the reproduction which are exactly proportional to the output signals of the ICM, the Helio transfer characteristic is carefully measured and a compensating distortion used in the Tone Scale Memories, 88. The predistorted signals C'M'Y', and K' are then sent to the Helio Formatter, 91. This unit has the function of synchronizing the entire color engraving system to the rotational speed of the Helio. In this system only one cylinder is engraved at a time, so that the one output is converted to analog form by the digital-to-analog converter, 92, and then sent to the Helio. In the particular case of the Helio, the black and magenta cylinders use one raster ("elongated") while the yellow and cyan use another ("compressed"). Data is stored on the disk only in elongated form. For the yellow and cyan cylinders, the image data is converted to compressed raster using a hardware interpolator, 85. Either one or two data samples per cell can be used, depending on the type of copy.

For using the system with letterpress or offset printing, halftone images can be used. These can be produced by various electronic screening methods well known in the art. Alternatively, continuous tone ink density images could be produced in the form of film negatives, from which the printing plates could be made by the usual methods. In both cases, however, the resolution required in the digitally processed images is of the order of 600 samples per inch, which is much greater than in the case of the Helio, where only one or two samples per cell suffice. The principle of operation remains the same, but the Helio has a distinct advantage over the other plate or cylinder preparation methods when computer-based pre-press systems are considered.

3. The Color Translation Module (CTM)

Figure 3:
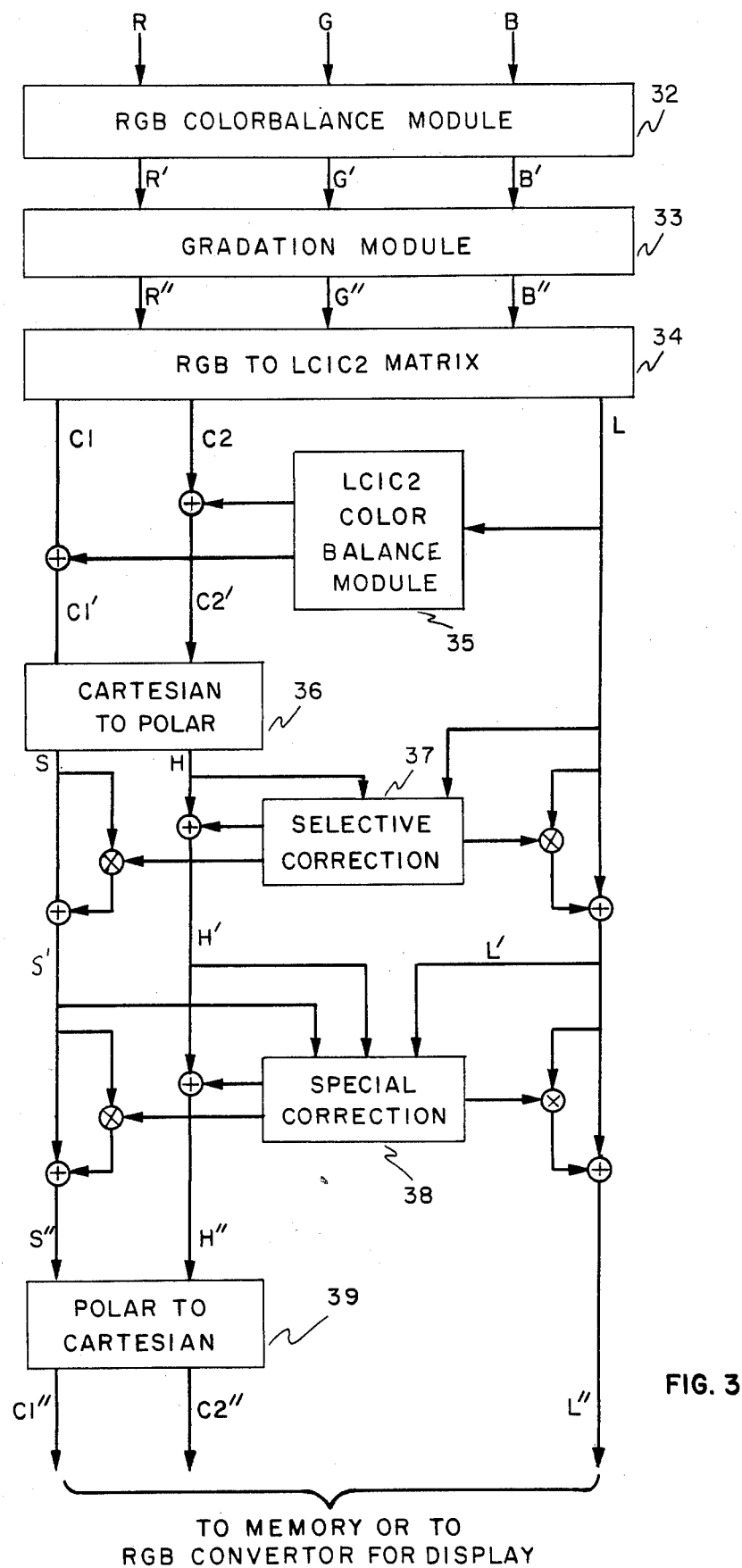
FIG. 3 shows the operation of a Color Translation Module (CTM).

The CTM is shown in FIG. 3. It receives RGB digital TV signals at a 10 Mhz data rate from the TV memory. These signals pass through a succession of modules, eventually emerging in LC1C2 form. For display in the TV, these signals are converted to RGB form using the above mentioned transformation, implemented in high speed digital hardware. When the CTM is used to process the high resolution original image, the LC1C2 output is returned directly to memory without conversion to RGB form.

The first module in the CTM is the RGB Color Balance Module (CBM), 32. Its function is to produce, from the original copy, the same signals that would have been produced had the illumination been different when the original was first exposed. In this way, small errors in color balance or exposure can be corrected rather accurately. The RGB CBM operates by passing the RGB signals through TSM's which incorporate the film transfer characteristic so that the output is proportional to the logarithm of the exposure of each layer in the film emulsion. These values can be increased or decreased by adjustable increments, independently for each layer, to simulate more or less exposure in each color band. The corrected exposures are passed through a second set of TSM's, again incorporating the film transfer characteristic, to give the adjusted signals, R'G'B'.

The next unit is the gradation module, 33, which adjusts the contrast and brightness of the image. The operator has six knobs available, the settings of which determine the contents of three identical TSM's through which the R'G'B' signals are passed. These are quite similar to those found on color scanners. The "white" and "black" controls select the end points of the scale, thus selecting a suitable range of input levels to be mapped into the output range 0 to 255. The rest of the controls have no effect on the end points. The "brightness" control gives a concave up or down shape to the transfer curve; the contrast control makes it "s" shaped in either direction; the highlight and shadow contrast controls affect those regions of the curve more than the balance. Note that the computation of the TSM contents in response to knob motion need only be done rather slowly, so that it is complete in one or two frame times. The TSMs are loaded during the TV retrace time so as not to interfere with the display. The following modules in the CTM use a similar technique, i.e., a logically simple but high speed video data path in combination with a more complicated but low speed knob computer.

The next step is conversion to LC1C2 form by a hardware implementation of the given transformation, followed by the LC1C2 Color Balance Module, 35. Its function is to make somewhat different color balance adjustments, including separate adjustments in highlights, midtones, and shadows. It can correct for blue shadows, for example, which sometimes occur in outdoor scenes in clear weather when the shadows are illuminated primarily by blue skylight. It operates by adding to the chrominance vector, another vector which is adjustable in amplitude and direction, independently in highlights, midtones, shadows, and overall.

The next two modules operate on chrominance in polar coordinates, so that the C1C2 signals must be converted in a hardware Cartesian to Polar Coordinate Converter, 36. Selective Correction, 37, divides the hue circle into seven smoothly overlapping regions, red, orange, yellow, green, cyan, blue, and magenta. Signals within each region can be independently adjusted in hue, saturation, and luminance. With these controls, the operator can achieve nearly any desired overall color change in an image. For example, the reds can be made darker, less saturated, and less orange, while the blue-greens can be made lighter, more saturated, and greener, and so one. As mentioned above, this module is divided into a video path and a knob computer. The latter computes the contents of three memories which are then addressed by hue, the contents being added to L, H, and S.

The final module, called Special Correction, 38, operates in much the same way as Selective Correction, 37, to change the luminance, hue, and saturation, but only within a "chromatic neighborhood" of adjustable width and location in both hue and saturation. In this way, it is often possible to pick out one object in the image and change it without affecting the balance of the image. In the absence of such a capability, it is necessar to draw very precise outlines around objects in order to achieve local color correction.

After Special Correction, hue and saturation are converted back to C1C2 form by a hardware Polar to Cartesian Coordinate Converter, 39, for passage to storage or the display.

It will be noted that hue is a "circular" variable corresponding to angle in polar coordinates. Thus any and all values of the angle represent real hues. To change hue, a correction can be added of any amount without regard for the possibility of producing a non-realizable value. Saturation (or chrominance) and luminance, however, are non-negative variables with maximum values. Hence when it is desired to change them, care must be taken not to go off scale. For this reason, the values of the selective or special corrections computed by the knob computers do not only depend on the knob settings, but are zero for original values of S or L which are either zero or maximum, smoothly varying to a maximum value for intermediate values of S and L. In addition, changes in these variables are more or less perceptible according to the proportion the change bears to the original value. Therefore the correction is multiplied by the original value and added to it to secure the appropriate proportionality.

Figure 3A:
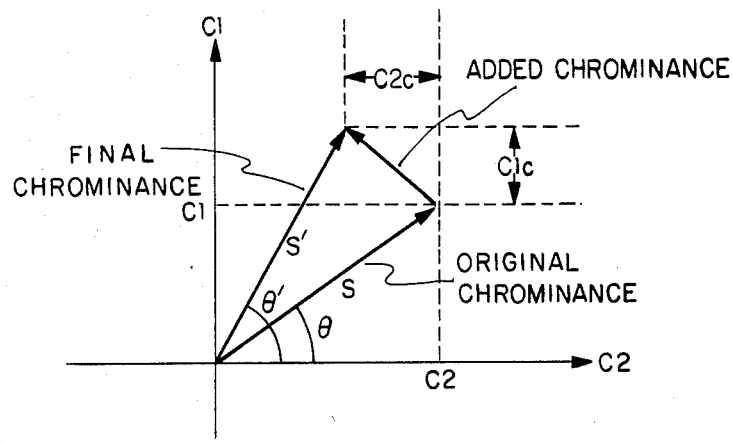
FIGS. 3a, b, and c show further details of one of the component modules of the CTM, the LC1C2 color balance module.

In order to make the operation of the CTM understandable to those skilled in the art, a more detailed explanation of one of the modules, the LC1C2 Color Balance Module, 32, is given. As noted above, this module enables the addition, to the chrominance of each image sample, of a chrominance vector which is adjustable in both amplitude and angle, as shown in FIG. 3a. Said additional vector can be separately adjusted in the highlights, midtones, and shadows of the signal, and combined with a vector which is independent of luminance. Thus there are eight controls used by the operator to adjust the angle and amplitude of the four components of the added chrominance.

Figure 3B:
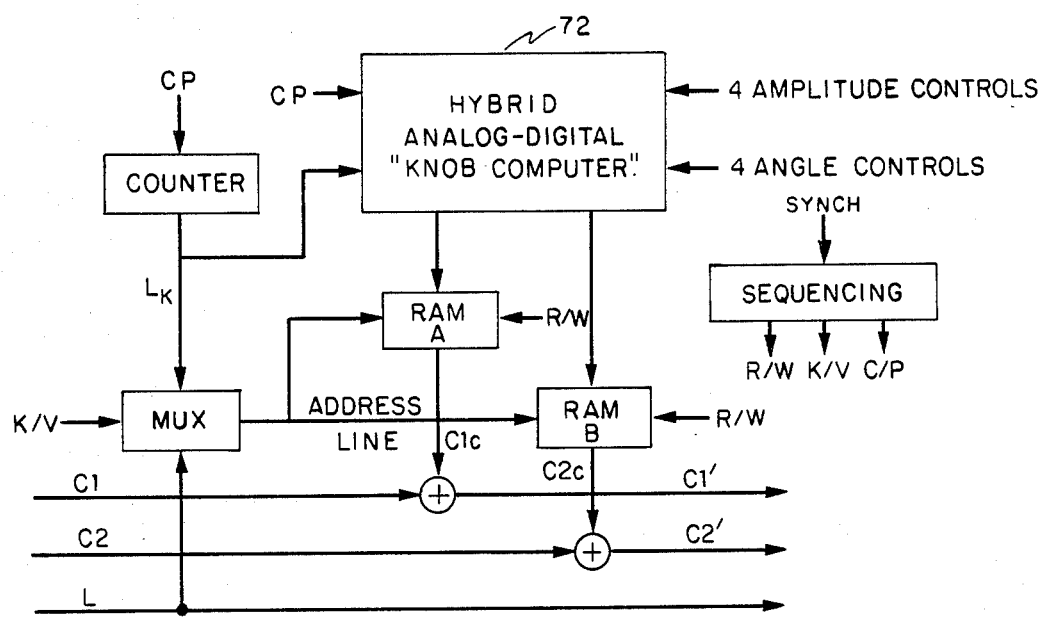
Figure 3C:
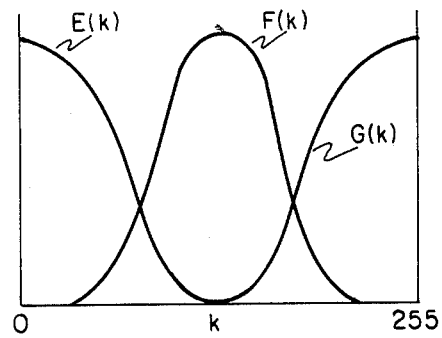

FIG. 3b shows the manner in which the added components are calculated and added to the input chrominance. For purposes of explanation assume that the luminance is represented by an 8-bit digital number and thus has 256 possible values ranging from 0 to 255. The chrominance components also use 8-bit representations and thus range from $-128$ to $+127$ in value. Two random-access memories (RAMs) of 256 8-bit numbers each are used to store the components of the added chrominance vector. These components have the values:

$C1c(k) = No \cos To + Ns\ E(k) \cos Ts + Nm\ F(k) \cos Tm + Nh\ G(k) \cos Th$ $C2c(k) = No \sin To + Ns\ E(k) \sin Ts + Nm\ F(k) \sin Tm + Nh\ G(k) \sin Th$ where k is the luminance value, No, Ns, Nm, and Nh are the amplitudes and To, Ts, Tm, and Th are the angles (hues) of the four added components. The subscripts o,s,m, and h mean overall, shadows, midtones, and highlights, respectively. $E(k)$, $F(k)$, and $G(k)$ are weighting functions which serve to confine the effect of each set of controls of the appropriate portion of the tone scale, as shown in FIG. 3c. Many different shapes of weighting functions can be used.

A sequencer unit receives TV synchronizing signals of conventional type, which are also used to synchronize the TV display used for observation. During the active portion of each scan line, the K/V signal switches the multiplexer (MUX) to the V (video) position, and the R/W signal switches the RAMs to the R (read) position. Thus the input luminance signal, L, addresses the RAMs, retrieves C1c and C2c, and results in the RAM contents being added to the input chrominance components to produce the outputs C1' and C2'.

The sequencing circuit also produces a clock pulse (CP) which increments a counter which produces a synthetic luminance signal, Lk. The knob computer, 72, continuously calculates C1c and C2c as given by the above expressions. Each pair of values must be written into the RAMs after calculation. In order not to disturb the viewed image, this can conveniently be done during the TV retrace interval between scan lines. During this interval, the MUX is switched to K (knob) position and the RAMs to W (write), and the CP input to the knob computer enables the output of the previous computed values to be stored. Since 512 values must be computed in response to each set of knob positions, and since there are 525 lines per TV frame, an entire computation can be done in one frame time, with one datum being transferred to RAM in each retrace interval. It has proven convenient to use a hybird analog-digital computer to perform the said computation, but any known form of computation can be used in the invention.

4. The Comparison Display

A very important element in the system is the Comparison Display, shown in FIG. 4, on which the operator relies to judge the prospective output image. For colorimetric accuracy, the separate phosphor intensities must be exactly proportional to the tristimulus values of the displayed image with respect to the TV phosphor primaries. [If the RGB values were with respect to some other set of primaries, they could easily be converted with $3 \times 3$ matrix transformation.] The desired proportionality can be achieved by measuring the phosphor intensities, one by one, as a function of the analog input voltage, and inserting a compensating pre-distortion in the TSM's shown in FIG. 4. After said predistortion, the signals are converted back into analog form by the digital-to-analog converters, 42, and applied to the TV monitor, 42. The monitor contains an analog video amplifier in each channel, so that peak phosphor intensity is attained with a digital input near 255 and zero intensity with digital input near 0, by adjustment of the amplifier gain and offset controls.

One more step is required to give an absolute calibration. As shown in FIG. 4, an illuminated image is placed next to the TV, and both are surrounded by an illuminated border. A sheet of white paper of the type to be printed is placed in the comparison position and its illumination adjusted so as to be equal to peak white of the TV. Of course, both peak white and the illumination must be of a suitable color temperature, for example 5000 degrees Kelvin. Finally, it is found useful to keep the surround near peak white as a means of reducing the influence of extraneous nearby visual stimuli. Care must be taken that no light falls on the TV tube. A method to accomplish this is to arrange fluorescent lamps, 43, in a square pattern a few inches in front of the tube 42, and the comparison image, 45. Diffusing material, 44, is placed in front of the lamps and next to the comparison image, while opaque material, 46, is placed so as to shield the tube from the light.

As a test of the system, a test pattern of known tristimulus values is printed. The corresponding RGB signals are displayed on the TV. The two images should match. Occasional adjustment of the analog gain and offset controls in the TV video amplifiers is required to recalibrate the display. Only very rarely must the TSM's be recalibrated.

It is to be pointed out that the TV display has been described without regard to the printing inks. This is an important difference from prior art, in which an attempt was made to make the TV look like the printed page. In the current invention, the TV simply displays colors of correct tristimulus values, something it does very easily since it is an additive display. No change in the TV is required for use with different inks and paper, or even with a different printing process. Only the EGA contains any data relating to the specific inks being used.

5. The Ink Correction Module (ICM)

The ICM is shown in some detail in FIG. 5. As discussed above, it could be implemented in one huge lookup table, but this would be uneconomic and would also give no clue as to how to find the data to be stored in the LUT, short of an impossibly large printing test. For purposes of this explanation, let us assume that the LUT, 80, has 512 entries only. The RGB input signals, 10, are transformed by TSM's, 63, into the log domain. If RGB are linear, then the conversion is a true log transformation; if RGB are on the preferred lightness scale, then the transformation is more nearly linear. In any event, the signals Dr, Dg, and Db, 11, are a representation of the color in terms of three ideal dyes, each of which absorbs, more or less according to density, in only one band (i.e., in red, green, or blue) and is perfectly transparent in the other two bands. Since these are not real dyes, they can have any density, and in particular, the maximum density must be high enough to represent the darkest color encountered. A previously-determined amount of black, as explained below, is to be printed for each combination of densitities, and this value is calculatted in the K-algorithm module, 65, producing the black density signal, K, 12. The Under-Color Removal (UCR) module, 67, calculates the densities of the underlying inks which, in combination with the chosen amount of black, produce the same appearance. If the inks were transparent, each of the colored inks should be reduced in density by exactly the amount of black added. Since the inks are generally far from transparent, this simple relationship is quite inaccurate except for a very small amount of black. We have found that a fairly accurate result is achieved with the following relationship:

$D'r = (Dr - K)/(1 - aK)$
$D'g = (Dg - K)/(1 - bK)$
$D'b = (Db - K)/(1 - cK)$

The factors a,b, and c are properties of the black ink. They can be found by a regression analysis using a number of printed samples of ink combinations with and without black. It should be noted that the numerator of these equations gives the values which would result if the inks were transparent. The denominator is the correction due to the non-transparency of the black ink.

It is now required to find the densities of the actual inks to be used which, in combination with the chosen amount of black, will have the appearance specified by the tristimulus values, R, G, and B. This is the usual "ink correction" problem, which, in the prior art, is solved by forming an electronic model which is an approximate analog of the ink mixing process. In the current invention, this is done in a two-stage process, a simple model followed by a small lookup table for final corrections. The model is implemented in the "B-matrix", 70, and can be of the following form:

$C' = d\ Dr' + e\ Dg' + f\ Db' + m$
$M' = g\ Dr' + h\ Dg' + i\ Db' + n$
$Y' = j\ Dr' + k\ Dg' + l\ Db' + o$

Such a model corrects primarily for the unwanted absorptions of the inks, i.e., the fact that the inks absorb in wavelength bands other than that desired. For example, the cyan ink should absorb more or less red light in proportion to its density, but be completely transparent to blue and green. In fact it also absorbs somewhat in blue and green. The coefficients d through o can be found by a regression analysis of a large number of printed samples.

After processing by B-matrix, 70, the densities C', M', and Y' will have some remaining error, which is removed by the LUT, 80, which operates in the following manner, which will be described using particular numerical values for the precision of the signals and the size of the table, although the invention is not limited to said values. If the input signals are eight bits each, representing 256 possible analog signal values, the three most significant bits of each input variable, 9 in all, are used as addresses to the table. At each address are stored the precise values of the ink densities, C, M, and Y which produce the correct appearance. [The manner of finding these values is discussed below.] The 5 least significant bits of each input signal, 15 in all, are used for three-dimensional linear interpolation, in a manner well known in the art, to give the final output values.

6. Finding the Values for the B-matrix

In order to explain how the LUT values and matrix coefficients are found, it is first necessary to discuss the operation in the case of three-color printing, without black. In that case, blocks 65 and 67 are absent from FIG. 5, and the signals 11 are the input to the B-matrix, 70. The fundamental problem, given the appearance values, RGB, of a particular colored visual stimulus, is how to find the exact combination of inks which form a visual match with said stimulus. For the sake of explanation, we must first assume that such a combination exists. This is done by means of the following steps: (a) Print a suitable number of combinations of inks, for example 9 evenly-spaced steps of density, ranging from zero to 256 in steps of 32, of each of the three inks, or 729 separate colors in all; (b) Measure the appearance values of each color patch, using a very accurate colorimeter, such as the Hunter Model D 25-9; and (c) Find the coefficients of the B-matrix by regression analysis, so as to minimize the mean square error between its outputs, C'M'Y', and the actual densities of the patches, CMY, for the 729 experimental cases.

7. Finding the Values for the Lookup Table

There are 512 specific entries in the LUT. The addresses of these entries are various combinations of C'M'Y', where the variables take on the values 0, 32, 64 . . . 224. Each of these combinations represents the appearance of a particular color in terms of idealized inks. The entries in the LUT are the values of ink density, CMY, which exactly match these colors. In general, the CMY values will be different from the corresponding C'M'Y' values. The experimental data, derived from the 729 patches, consists of the values of CMY equal to 0, 32, 64, . . . 256, together with the corresponding measured RGB values. These are then processed by TSM's, 63, and B-matrix, 70, to give C'M'Y' values which in general do not include the values 0, 32, 64, . . . 224. Thus the experimental values are not coincident with the desired LUT entries, but are interspaced between them in color space. The LUT entries must be found from the experimental data by a process of interpolation. Any known interpolation process is within the scope of the invention. For example, we have used a manual, graphical method where contours of constant C'M'Y' were drawn in between the experimental points located in CMY space.

It should be noted that a considerable amount of variability will be found in the colorimeter readings of the experimental ink patches. When finding the B-matrix coefficients by regression, this variability is automatically averaged out. However, when interpolating, some averaging of the data is an essential preparatory step. It is also advisable to adopt some method for detecting highly erroneous data due to some random defect in ink or paper, so that such data can be excluded from the process.

The LUT values can also be found by an iterative method which lends itself to rapid machine computation. The steps in this process are as follows (a) Begin with approximate values of the LUT entries, obtained by manual interpolation or by any other convenient method. Print these colors, measure the corresponding RGB values, and process the latter with modules 63 and 70, finding the corresponding C'M'Y' values; (b) Adjust the LUT entries according to the error in C'M'Y', so as to reduce said error on the next iteration of the procedure; and (c) Repeat the process until the error is reduced to an acceptably small value.

The repeated printing step, which is very time-consuming, can be avoided by interpolating within the experimental data. This amounts to using the experimental data in a LUT exactly like 80, except that when interpolating from CMY to RGB (or directly to C'M'Y'), the experimental patches are precisely the entries required for the table, since CMY have the values 0, 32, 64, . . . 224.

8. The Four-color Case

For understanding the four-color case, we return to FIG. 5, including blocks 65 and 67. Recall that the sensation of color has only three degrees of freedom, i.e., three numbers serve to specify the appearance of any color. Obviously, therefore, we cannot independently specify all four ink densities and have the resultant ink mixture match a given color. In fact, any one of them can be specified independently and then only one unique combination of the remaining three can be found to make the match. A limitation on this process is found in the limited range of each ink. If the "match" calls for a negative density of any ink, or an amount in excess of the maximum printible density, then such a combination is physically unrealizable.

To elucidate the relationship of the black ink to the others, it is necessary to print all combinations of all four inks, for example nine different densities, ranging from zero to maximum, of each of the four inks, for a total of 6561 color patches, and then measure the resulting colors (i.e., RGB values) on a colorimeter. There will be a certain gamut obtainable with the three colored inks only, and a different gamut obtainable when at least some black is used. There will be an overlap of these two gamuts, and in this first range, for each color, there will be a certain range of black which is permissible. However, there also will be a second range of colors in which no black is permissible (generally these are colors using only one or two colored inks) and there will be a third range of colors which require the use of at least some black.

In the normal use of UCR, as indicated by the name of the process, black is used to replace some colored ink. This is possible only in the aforesaid first range. In the second range, no black can be used at all. The third range, representing many useful dark colors, cannot be attained by the normal operation of UCR. The present invention provides a method to obtain nearly the entire gamut of colors physically achieveable with the four printing inks.

If the inks were transparent, the density at any wavelength would be the sum of the densities of the separate inks at such wavelength. Prior art UCR uses this concept to add an amount of black at each point which is a given percentage, called the UCR percentage, of the lowest of the three ink densities. Each colored ink density is then reduced by the density of black chosen, theoretically resulting in unchanged values for the ink density as measured in the blue, green, and red parts of the spectrum, and therefore giving the same color. This procedure is defective for two reasons. One is that due to partial nontransparency of the inks, the total density is actually less than the sum of the component densities. Therefore colors with and without black will not match exactly. In addition, there is no way to reproduce colors in the aforesaid third range.

Aside from the fact that the prior art UCR method is inaccurate and that the complete gamut of colors cannot be produced, there is no good reason to use a constant percentage UCR, regardless of the overall density level. The reason for using any black at all in the prior art is primarily to reduce the amount of more expensive colored ink. Because of non-transparency, the amount of colored ink saved in light areas is substantially less than the amount of black added. Thus there is very little money to be saved by using black in light tones, since very little colored ink can be removed. Another reason for not using much black in light tones is that any error in the black calculation will produce an easily perceived reduction in image quality. In the dark areas, there is no reason for using only a little black. The colored ink reduction need not be calculated so accurately and, by using a large amount of black, a large amount of colored ink (and money) can be saved. Furthermore, in order to produce those colors in which one or two of the colored ink densities are zero, 100% UCR is required. For these reasons, the present invention provides for the use of a low percentage UCR in light tones, and a high percentage UCR in dark tones.

In FIG. 5, it is recognized that the quantities C'M'Y' are the densities of non-real inks, and thus can be made high enough to represent all the colors which are achievable with the four real inks. Thus the UCR concept can be applied to these non-real inks and still obtain the entire gamut. This is done by specifying the amount of black at each point in the LUT, ranging from none at all in the areas of one or two colored inks only (the second range) and in the very light tones of the first range, smoothly increasing in the darker tones of the first range, and then going up to a maximum of black in the colors in the aforesaid third range. FIG. 6 shows contours of constant black level as might be reasonable with typical inks. It will be recognized that the appropriate distribution of black depends on detailed measurements made on the particular set of inks to be used.

Once the amount of black is chosen at each point in the LUT, the method of finding the LUT values is exactly the same as in the three color case, except that in each printing test (or interpolation) in the iterative method, the chosen amount of black is printed as well. If the UCR algorithm of module 67 were perfect, the LUT entries of the three-color case would serve equally well in the four-color case, since the LUT is used to find the real ink densities, CMY, which exactly match the color underlying the black, which is represented by C'M'Y'. Since the UCR algorithm is good but not perfect, a few iterations, starting with the three-color values, will give the proper four-color values.

Referring again to FIG. 5, it is to be noted that, in the actual process, the signals 11, representing the appearance of colors in terms of ideal inks, serve as the input to the K algorithm module, 65, which calculates the black ink density. However, said density has been determined as a function of C'M'Y'. The B matrix, 70, and the UCR algorithm, 67, are simple and therefore invertible closed-form algebraic expressions. Therefore it is straightforward to redefine K in terms of Dr, Dg, Db. It is useful, in this process, to have defined K in closed algebraic form rather than as a table of 512 discrete values so that, in the conversion to Dr, Dg, Db dependency, no interpolation errors are introduced.

What I claim is:

1. A system for reproducing a color original in a medium using a selected multiplicity of reproduction colorants, the system comprising in serial order:
   a. a scanner for producing from said color original a set of three tristimulus appearance signals dependent on the colors in said original;
   b. display means connected to the scanner for receiving the appearance signals and aesthetic correction circuitry for interactively introducing aesthetically desired alterations into said appearance signals to produce modified appearance signals; and
   c. colorant selection mechanism for receiving said modified appearance signals and for selecting corresponding reproduction signals representing values of said reproduction colorants to produce in said medium a colorimetrically-matched reproduction.

2. The system of claim 1 wherein said appearance signals are the RGB tristimulus values of said original.

3. The system of claim 1 further comprising transformation circuitry in said colorant selection means for transforming said modified appearance signals into corresponding color densities for use in selecting said reproduction signals.

4. The system of claim 1 wherein the aesthetic correction circuitry comprises:
   a. storage means for storing the appearance signals from the scanner;
   b. modifying means independent of the storage means for modifying the appearance signals from the scanner;
   c. translation means connected to the modifying means and the storage means for translating the stored appearance signals into aesthetically modified signals upon instruction from the modifying means, and
   wherein the display means comprises a television display device connected to the modifying means for displaying the interactively modified appearance signals, the display means having three phosphor light sources, the intensities of which are directly proportional to the appearance signals as modified.

5. The system of claim 4 wherein the aesthetic correction circuitry further comprises an excessive gamut alarm for indicating when a modified appearance signal can not be reproduced by the reproduction colorants.

6. The system of claim 4 where in the translation means further comprises a first color balance means for altering the color values of the appearance signals independently to simulate a different exposure of the original.

7. The system of claim 6 wherein the color balance means further comprises a plurality of tone scale memories which incorporate film transfer characteristics for the separate color values.

8. The system of claim 4 wherein the translation means further comprises a gradation control means for altering the color values of the appearance signals independently to simulate a different contrast and brightness in the original.

9. The system of claim 8 wherein the gradation control means further comprises a plurality of tone scale memories which incorporate brightness and contrast characteristics for the separate color values.

10. The system of claim 4 wherein the translation means further comprises:
    a. translator means for translating color values of appearance signals into luminance-chrominance values; and
    b. second color balance means for altering the chrominance values to adjust independently highlights, midtones and shadows in the original without affecting the gradation.

11. The system of claim 4 wherein the translation means further comprises:
    a. translator means for translating color values of appearance signals into luminance-chrominance values;
    b. polar conversion means for converting cartesian values of chromiance to polar values of hue and saturation;
    c. first color correction means for interactively modifying the luminance, hue, and saturation of individual image samples independently and selectively in a multiplicity of hue bands; and
    d. cartesian conversion means for reconverting the modified polar hue and saturation values into cartesian chrominance values.

12. The system of claim 11 wherein the translation means further comprises a second color correction means for interactively modifying the luminance, hue, and saturation of individual image samples selectively within a chromatic neighborhood of adjustable hue and saturation ranges.

13. The system of claim 6, 7, 8, 9, 10, 11, or 12 wherein the system is divided into a first part comprising a high speed data path in which digital video signals are modified by interaction with the contents of a plurality of random access memories addressed by said digital video signals, and a second part in which the contents of said memories are calculated in response to operator-initiated control settings, at a rate fast enough to give an essentially continuous visual display, but at a rate slower than the data rate in the said first part.

14. The system of claim 1 wherein the colorant selection means further comprises:
   a. first processing means to convert the appearance signals into first signals representative of the densities of idealized inks which each absorb light more or less in only one color band;
   b. second processing means to convert said first signals into second signals representative of densities of idealized inks, each of which absorbs light in all color bands in approximately the same degree as the real inks to be used for reproduction; and
   c. third processing means comprising a lookup table for converting said second signals into colorant values so that the combination of colorants forms a colorimetric match with said appearance signals.

15. The system of claim 14 wherein the system further comprises under-color removal circuitry comprising:
   a. fourth processing means to calculate black colorant values as a function of the appearance signals; and
   b. fifth processing means to calculate signals representative of reduced idealized ink densities, each absorbing in only one color band, which combination of reduced inks together with a selected amount of black, form a color which approximately matches that of the combination of idealized inks before reduction.

16. The system of claim 1, 2, 3, 4, 5, 6, 7, 8, 9, 10, 11, 12, 14 or 15 wherein the medium is a gravure printing system.

17. The system of claim 1, 2, 3, 4, 5, 6, 7, 8, 9, 10, 11, 12, 14 or 15 wherein the medium is a letterpress printing system.

18. The system of claim 1, 2, 3, 4, 5, 6, 7, 8, 9, 10, 11, 12, 14 or 15 wherein the medium is an offset printing system.

19. In a color reproduction system in which a lookup table is used to calculate the desired amount of colorant, the method of finding the entries of said table comprising the following steps:
   a. printing a multiplicity of combination of amounts of colorants spanning the full range of such physically realizable combinations;
   b. measuring the appearance values of all the combinations using a colorimetric and calculating the corresponding lookup table inputs;
   c. choosing a trial set of entries of said table on the basis of the results of steps (a) and (b);
   d. printing color patches corresponding to each of said entries, measuring their appearance values with a colorimeter, and calculating the corresponding lookup table inputs;
   e. determining the lookup table outputs corresponding to the said inputs;
   f. printing the colorants of step (e), measuring the corresponding appearance values, and calculating the corresponding lookup table inputs;
   g. on the basis of the results of steps (d) through (f), adjusting the lookup table entries in such a direction as to reduce the discrepancy between successive sets of lookup table inputs; and
   h. repeating the process until the discrepancy between results on successive iterations is acceptably small.

20. A method for reproducing a color original using a selected multiplicity of reproduction colorants, the method comprising:
   (a) scanning said original to produce a set of three tristimulus appearance signals dependent on the colors in said original;
   (b) surrounding and illuminating the original with a reference white border;
   (c) displaying said appearance signals as an image on a television display device having three phosphor light sources, the intensities of which are directly proportional to the appearance signals, the display device also comprising an illuminated reference white element;
   (d) modifying the appearance signals until the displayed image is a colorimetric match of the reference white illuminated original;
   (e) translating the modified appearance signals into colorant value signals;
   (f) selecting the amounts of particular colorants in response to the colorant value signals; and
   (g) using said colorants to form a reproduction.

21. In a color reproduction system in which a lookup table is used to calculate the desired amount of colorant, the method of finding the entries of said table comprising the following steps:
   a. printing a plurality of colorant combinations with varying amounts of colorants spanning the full range of physically realizable combinations;
   b. measuring the appearance values of each of said combinations using a colorimeter and calculating a corresponding lookup table input value;
   c. choosing a set of initial entries for said table on the basis of the results of steps (a) and (b);
   d. determining the lookup table outputs corresponding to the said inputs; and
   e. filling said table with additional input and output values by interpolating between said input and output values of said initial entries.

* * * * *